United States Patent [19]

Loncaric et al.

[11] Patent Number: 5,052,736
[45] Date of Patent: Oct. 1, 1991

[54] MODULAR DEXTEROUS HAND

[75] Inventors: Josip Loncaric, Columbia; Fabrice de Comarmond, Silver Spring, both of Md.

[73] Assignee: The University of Maryland, College Park, Md.

[21] Appl. No.: 474,165

[22] Filed: Feb. 2, 1990

[51] Int. Cl.$^5$ .......................... B25J 15/10; B25J 15/00
[52] U.S. Cl. ........................................ 294/106; 623/57; 901/38; 901/39; 901/45
[58] Field of Search ................. 294/86.4, 106; 901/31, 901/32, 36, 38, 39, 45, 49; 623/57, 63, 64, 65

[56] References Cited

U.S. PATENT DOCUMENTS

| | | | |
|---|---|---|---|
| 2,889,936 | 6/1959 | Kassner | 294/106 X |
| 3,866,966 | 2/1975 | Skinner | 294/106 |
| 3,911,981 | 10/1975 | Tucek | 294/106 X |
| 4,351,553 | 9/1982 | Rovetta et al. | 294/106 |
| 4,367,893 | 1/1983 | Berg | 294/106 |
| 4,598,942 | 7/1986 | Shum et al. | 294/106 |
| 4,623,183 | 11/1986 | Aomori | 294/106 X |
| 4,653,793 | 3/1987 | Guinot et al. | 294/106 X |
| 4,828,276 | 5/1989 | Link et al. | 294/106 X |
| 4,834,761 | 5/1989 | Walters | 294/111 X |
| 4,850,631 | 7/1989 | Dotsko | 294/86.4 |
| 4,921,293 | 5/1990 | Ruoff et al. | 294/111 |
| 4,955,918 | 9/1990 | Lee | 294/111 X |

FOREIGN PATENT DOCUMENTS

| | | | |
|---|---|---|---|
| 140569 | 5/1985 | European Pat. Off. | 294/106 |
| 1130221 | 5/1962 | Fed. Rep. of Germany | 294/106 |
| 867648 | 4/1981 | U.S.S.R. | |
| 1217658 | 3/1986 | U.S.S.R. | |
| 2058714 | 4/1981 | United Kingdom | 294/106 |

OTHER PUBLICATIONS

Barry Wright Corporation Bulletin R06-84 (1984); GTP-453C, Astek Gripper.

*Primary Examiner*—Margaret A. Focarino
*Assistant Examiner*—Andrew C. Pike
*Attorney, Agent, or Firm*—Oblon, Spivak, McClelland, Maier & Neustadt

[57] ABSTRACT

A modular dexterous grasping hand comprises three rotatable fingers mounted on the mounting plate of a Stewart platform for rotation about parallel axes extending perpendicular to the mounting plate. The fingers have a generally L shape so that the grasping elements at the distal ends of the fingers are spaced from the rotational axes. The grasping elements can thus be positioned along the arcs of circles centered on the rotational axes, and so form grasping triangles of variable shapes and sizes. The fingers are independently driven by motors mounted to the mounting plate. Positional encoders and pressure sensors may be included in the motor drive control system.

12 Claims, 3 Drawing Sheets

MODULAR DEXTEROUS HAND

BACKGROUND OF THE INVENTION

1. Field of the Invention

The present invention is directed to a dexterous hand, more particularly a modular dexterous hand in which the functions of grasping and fine manipulation are carried out by separate stages of the hand.

2. Background of the Related Art

Numerous devices have been proposed as grasping hands for use with robot arms. The simplest consist of simple parallel jaw grippers. However, the resulting two-point grasping contact has been found to be insufficient to prevent rotation of the grasped object, except in special cases.

More complex systems include anthropomorphic designs which are suitable for master/slave control by a human operator. Jacobsen, Wood, Knutti and Biggers; "The Utah/MIT Dexterous Hand: Work In Progress" (The International Journal of Robotic Research, vol. 3, No. 4, 1984). However, anthropomorphic designs are relatively complex. Moreover, since the fingers are multi-jointed, the fingertips pivot about axes perpendicular to the length of the fingers, so that the fingertips do not always move within a single plane. This makes it complex to grasp small objects lying on flat surfaces such as tabletops.

Another problem with anthropomorphic designs is that both grasping and fine manipulation are provided by the same structure, although this feature is not limited to anthropomorphic designs. This coupling implies that fine manipulation of the grasped object will involve rolling the object between the fingertips, and this can result in a loss of positional certainty of the object if a precise knowledge of the shape of the object near the contact points is not well known.

U.S. Pat. No. 4,653,793 (Guinot et al) discloses a multiple point contact gripper in which three grasping fingers are movable linearly toward and away from one another to form a deformable grasping triangle at their tips. Two of the finger tips are formed by rotatable balls while the other is formed by a ball fixed to the finger tip. However, since the fingertips must move linearly, it is difficult to grasp small objects, and obstructions in the path of movement of the fingertips can make grasping difficult. In the embodiment of FIG. 8 of Guinot et al, the fingertips pivot about axes perpendicular to the length of the fingers, and so suffer from the same shortcomings as do those of anthropomorphic hands, i.e., the fingertips do not remain in a plane as they move, which makes it difficult to pick up objects, especially small objects, from tabletops.

SUMMARY OF THE INVENTION

It is an object of the present invention to provide a dexterous hand in which the fingers can grasp a randomly shaped object by the rotation thereof about axes perpendicular to a base.

It is a further object of the invention to provide a dexterous hand which can grasp objects lying on a flat plane.

It is a further object of the present invention to provide a dexterous hand having fingertips which define randomly shaped grasping triangles.

It is a further object of the present invention to provide a modular dexterous hand having separate stages for respectively grasping and providing fine manipulation of the position of a grasped object.

It is a further object of the present invention to provide a dexterous hand providing grasping by use of three points of contact with friction.

The above, and other objects, are achieved according to the present invention by a dexterous hand comprising a base, at least three grasping fingers mounted to the base for rotation about parallel axes, each of the fingers comprising a base end intersecting a respective one of the axes and a distal end, each distal end having a grasping element and being spaced from the respective axis in a direction perpendicular to said respective axis, whereby each of the distal ends describes a circle centered on the respective axis upon rotation of said fingers. Means are also mounted to the base for independently rotating each of the fingers so that the fingers can grasp a randomly shaped object by the rotation of the fingers.

According to another feature of the invention, a modular dexterous hand comprises a Stewart platform which may be attached to a robot arm, the Stewart platform having a mounting plate, an attachment plate attachable to the robot arm and six telescoping legs connecting the mounting plate to the attachment plate. Means are provided for defining three rotational axes mounted to the mounting plate, the rotational axes extending parallel to one another and perpendicular to the mounting plate, the axes also defining an equilateral triangle. Also provided are three grasping fingers, each of the grasping fingers having a base end rotatably mounted at one of the rotational axes and a distal end having a grasping element and being spaced from said respective axis in a direction perpendicular to the respective axis, whereby each of the distal ends describes a circle centered on the respective axis upon rotation of the fingers. Means mounted on the mounting plate are provided for independently rotating each of the fingers. Therefore, a randomly shaped object can be grasped by rotating the fingers. The object may be subjected to fine positional manipulations by varying the length of the legs of the Stewart platform, and the object may be subjected to gross positional manipulations by movement of the robot arm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
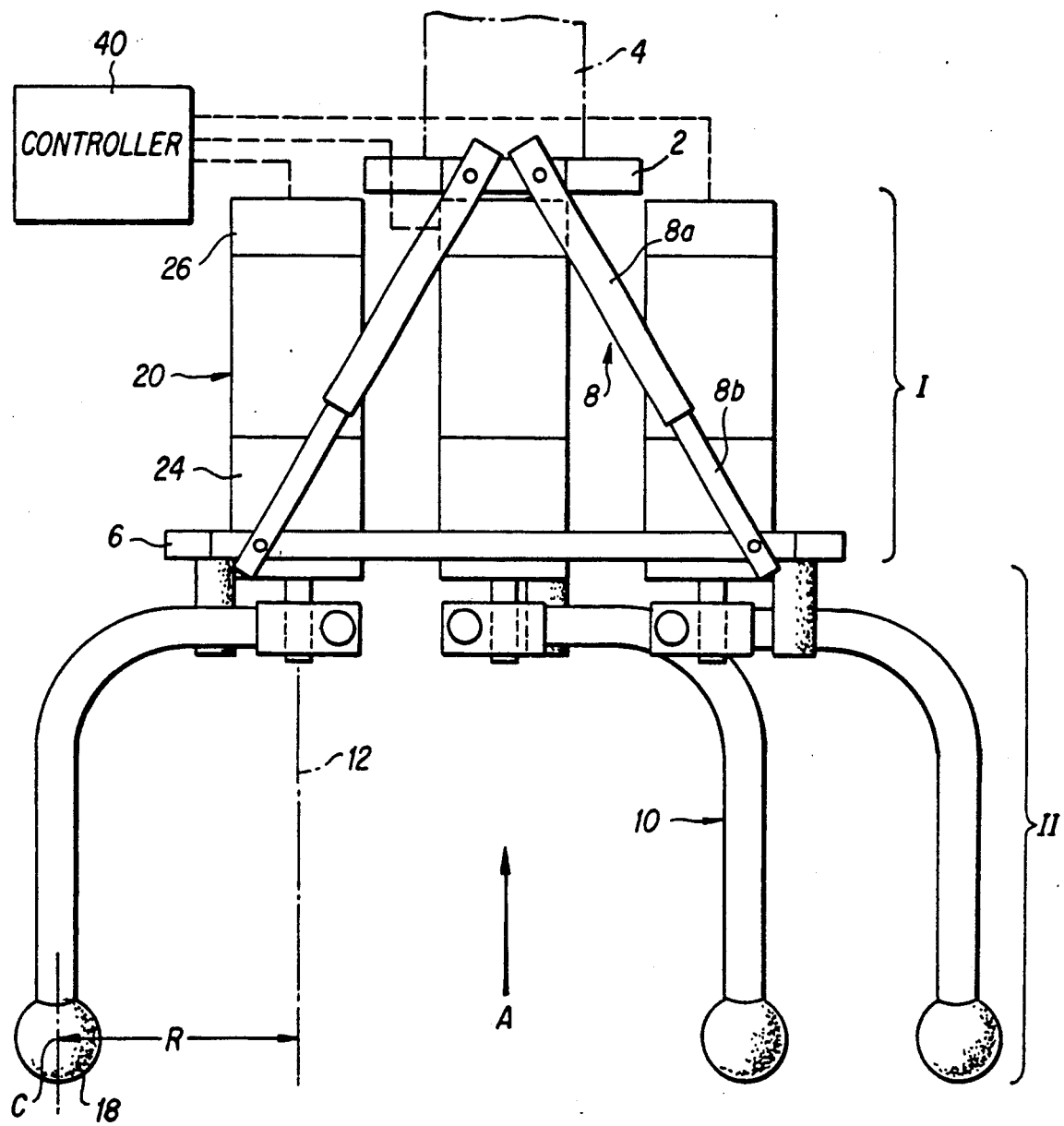
FIG. 2 is a side view of the hand shown in FIG. 1.

As best seen in FIG. 2, the modular dexterous hand of the present invention can generally be divided into two stages: a fine manipulating stage I and a grasping stage II.

The fine manipulation stage I may comprise a conventional Stewart platform. Stewart platforms are well known and are described, for example, by Fichter; "A Stewart Platform-Based Manipulator: General Theory and Practical Construction" (The International Journal of Robotics Research, vol. 5, No. 2, 1986). Since Stewart platforms are well known, only a general description thereof will be provided herein.

The Stewart platform comprises an attachment plate 2 which may be attached to the arm 4 of a conventional robot such as a GE GP-110 robot capable of providing a 50 kilogram payload capability. The attachment plate 2 is generally formed as a triangle having apexes which are truncated to form flat surfaces.

The Stewart platform also includes a mounting plate 6 which is spaced from the attachment plate 2 but is positioned substantially parallel thereto. The mounting plate 6 is shaped substantially identical to the attachment plate, i.e., an equilateral triangle having truncated apexes, but is rotated by 120° with respect to the attachment plate 2 and is larger than the attachment plate 2 so that its sides are aligned with the truncated apexes of the attachment plate.

Figure 1:
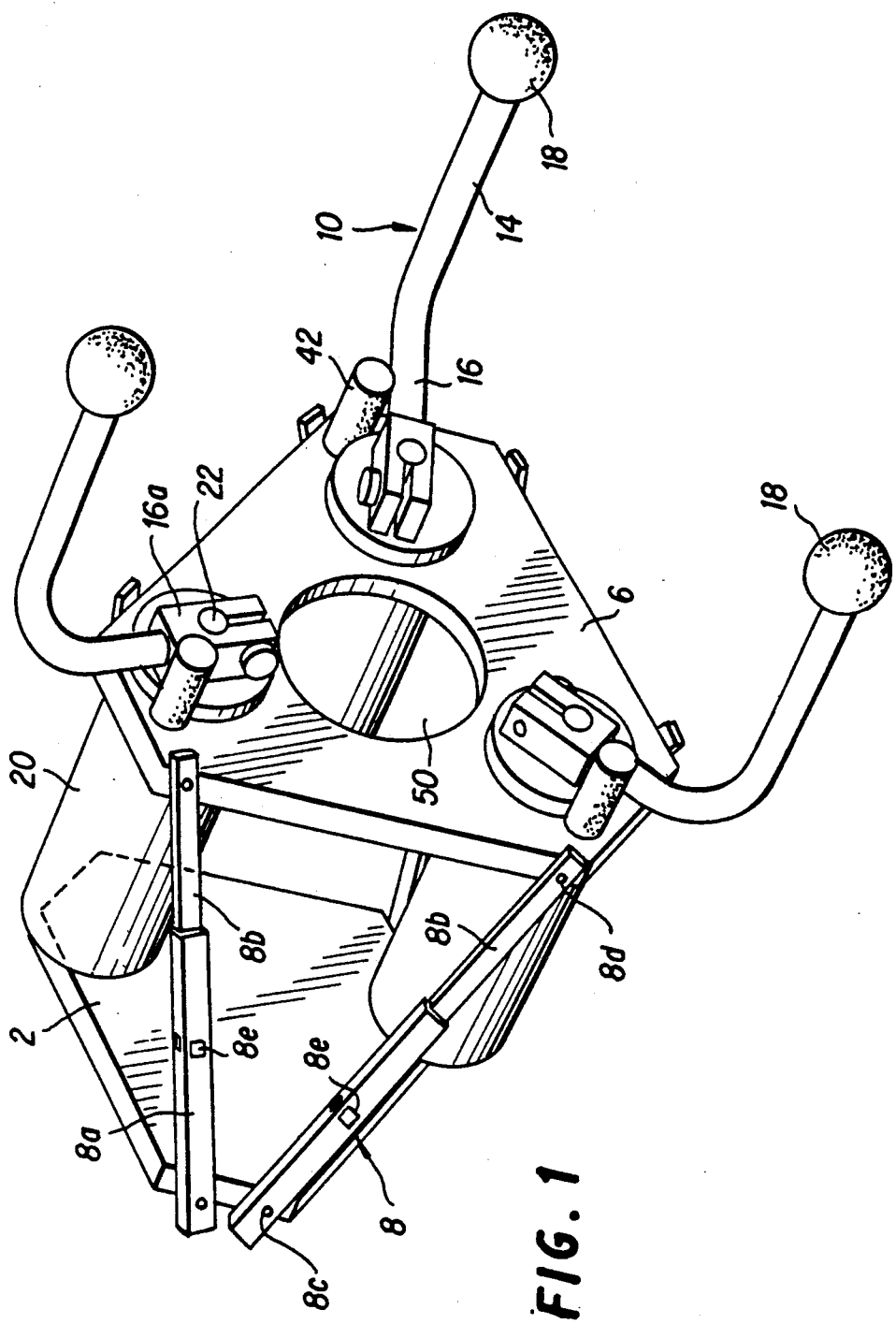
FIG. 1 is a perspective view of the modular dexterous hand according to the present invention.

Six legs 8 connect the attachment plate 2 with the mounting plate 6. The legs are arranged in pairs (only two are shown in FIGS. 1 and 2), and each pair of legs connects one of the truncated apexes of the attachment plate 2 with the respective sides of the mounting plate 6. In the simplest case, the platform legs 8 are rigid links having a fixed length, so that the attachment plate and mounting plate are positionally fixed relative to one another.

Alternatively, each of the legs may be telescopic, and variable in length, and may be attached to the attachment plate 2 and the mounting plate 6 via pivotal connections. This is schematically shown in FIGS. 1 and 2 in which each leg 8 is formed of telescoping leg sections 8a and 8b. The joint 8c may be a gimbal (Hooke joint), while the joint 8d may be a spherical (i.e., ball and socket) joint.

Although not illustrated, known systems may be used for varying the length of the legs 8. For example, each leg may be formed of a hydraulic cylinder having the cylinder end thereof attached to one of the plates and the piston rod end thereof attached to the other of the plates. By varying the lengths of the legs 8 in a controlled manner (e.g., by the controller 40 described below), one can vary the distance between the attachment plate 2 and the mounting plate 6, or provide pivoting of the mounting plate 6 relative to the attachment plate 2 about any axis, thereby finely manipulating the position of the mounting plate 6 relative to the attachment plate 2, and so relative to the robot arm 4.

Force and length sensors may be provided for monitoring both the position of, and forces applied to, the grasping stage. The measured parameters can be used to control the compliance presented to the environment. The force sensors may be strain gauges 8e mounted to each leg and connected to the controller 40 via appropriate circuitry.

The grasping stage II comprises three fingers 10 pivotally mounted on the mounting plate 6 for rotation about respective axes 12, the axes 12 being parallel to one another and extending perpendicular to the plane of the mounting plate 6, which forms a base for the fingers 10. Each of the fingers 10 comprises a rigid rod or tube 14 which has a generally L-shape (although, as in the preferred embodiment, the bend of the L may be curved about a relatively large radius). The rods may be formed, for example, from bent aluminum tubing. Each finger has a base end 16 which extends generally parallel to the mounting plate 6, which forms a base, and which is fixed to the axis 12. Each finger 10 also comprises a distal end having a grasping element 18 fixed thereto. In the preferred embodiment, the grasping elements comprise spherical elements formed of a high friction material such as an elastomeric material, i.e., rubber. The grasping elements 18 may have a smooth surface, but the surface may instead be textured in order to increase the frictional grasping force.

The grasping elements may be made touch sensitive. This may be done, for example, by sensing air pressure in an internal cavity of each grasping element 18. A solid state pressure transducer such as model EPI-080 made by Entran Devices Corp. of New Jersey may be used for this purpose.

Due to the generally L shape of each of the fingers, the center C of the distal end of each grasping element is spaced from the respective rotational axis of that finger, in a direction transverse to the rotational axis, by a distance R.

In order to independently rotate the fingers 10, three motors 20 are mounted to the mounting plate 6 and have rotational output shafts 22 extending coaxial with the axes 12 so that, for example, clamps 16a at the base ends 16 of the fingers may be clamped to the output shafts 22 in order to provide the rotational attachment of the fingers to the mounting plate about the axes 12. Although any type of motor may be used, DC servomotors with planetary gear heads 24 and positioning encoders 26 are shown.

Figure 3:
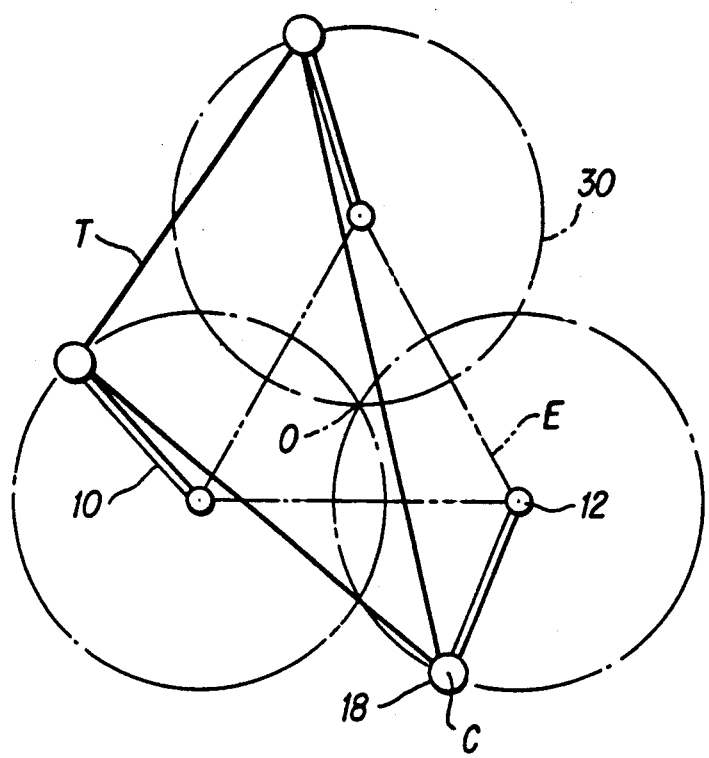
FIG. 3 is a schematic illustration of one deformable grasping triangle defined by the fingertips of the apparatus of the present invention.
Figure 4:
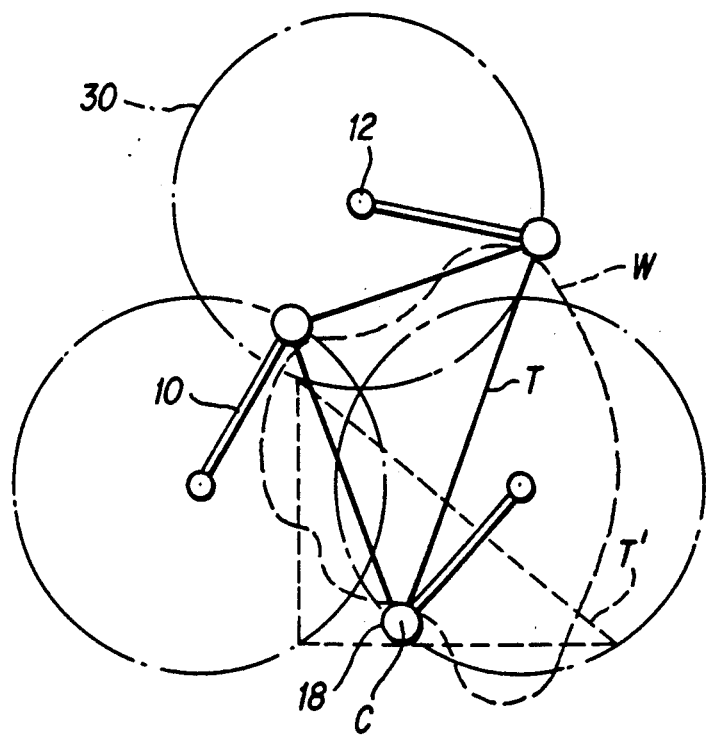
FIG. 4 corresponds to FIG. 3, but shows another deformable grasping triangle.

Upon the rotation of the fingers, each of the grasping elements 18 defines a circle 30, as best seen in FIGS. 3 and 4. Each of the circles is centered on an axis 12 and has a radius R. Each of the circles is in a plane parallel to the mounting plate 6. Preferably, all of the radii are equal.

The centers C of the grasping elements thus form a variable number of arbitrarily shaped triangles T, each of the triangles T having apexes on the respective circles 30. By rotating the fingers 10 until the apexes of the triangle T approach as close to three points on the outer surface of an object to be grasped as is possible in view of the finite size of the grasping elements 18, that object can be frictionally grasped by the grasping elements 18, regardless of its shape or orientation.

The axes 12 are preferably, but not necessarily, arranged at the apexes of an equilateral triangle E (FIG. 3).

Since the fingers 10 pivot about axes 12 which extend perpendicular to the mounting plate 6, the centers C always rotate in the same plane. This means that they can pivot to grasp a small object lying on a planar surface such as a table top.

Since the fingers 10 can pivot in either of two directions (clockwise or counterclockwise), they can avoid obstacles in the environment of the object to be grasped by rotating in a direction which avoids the obstacles. Moreover, since the fingers are rotatable independently of one another, they can grasp an arbitrarily shaped object.

In the preferred embodiment, the circles 30 substantially intersect at the point O. This means that the centers C can approach one another adjacent the point O for grasping small objects. The fingers can also grasp hollow objects from inside by first rotating to where the centers approach the point O, entering the object in the direction of the axes 12, and separating the fingers until the object is grasped.

The spherical grasping elements 18 are non-rotatably fixed on the distal ends of the fingers 10. The non-rotatable attachment of the grasping elements on the fingers increases their frictional grasping ability. Additionally, their spherical shape avoids the need to control their orientation, beyond controlling the position of their centers C. It is therefore only necessary to adjust the positions of the centers C for forming the grasping triangle T. The robot arm can then be used to position and orient the triangle T.

The motors 20 may be independently driven to rotate the fingers 10 by a controller 40. The controller may comprise a programmable general purpose computer which controls a servoamplifier for driving the motors 20. It also includes an input device receiving feedback signals from the positional encoders 26 so that the rotational position of the fingers 10 can be known.

The device also preferably includes a pressure sensor for detecting the grasping of an object by the fingers. Such a sensor can comprise a portion of the controller 40 which measures the drive current going to each of the motors 20 and determines that grasping has occurred based upon an increase in the drive current to the motors. The controller would then terminate drive to a given motor 20 when the drive current drawn by that motor reaches a value corresponding to that for a firmly grasped object.

Index pins 42 are mounted on the mounting plate at positions for initializing the positional encoders 26. In order to initialize the encoders, the arms 10 are rotated into abutment with the index pins which may be covered by an elastomeric material. An initial position for each motor may be set at the position where the resistance to further rotation of the fingers, due to abutment with the index pins, reaches a predetermined value, for example as measured by the drive current to the motors 20.

An opening 50 in the mounting plate 6 may be provided for the lens of a video camera (not shown) mounted between the plates 2 and 6 for viewing in direction A. The camera can be used for manual control of the hand or as an input to the controller 40.

For any grasping operation, the robot arm 4 first moves the hand assembly to a predetermined position where the object W may be grasped. The encoders 26 are previously or then initialized, if necessary. Subsequently, the base is correctly positioned and the arms 10 are rotated about the axes 12 until the object W is grasped. To do this, a grasping triangle is calculated for a given object. This may be done, for example, based upon shape data derived from a video camera in opening 50 and inputted into controller 40. The fingers 10 are then rotated to form this grasping triangle. Since the calculated grasping triangle is only an approximation, the rotation of the fingers is continued until the pressure sensors sense that grasping is completed.

The direction of rotation and the shape and orientation of the grasping triangle depend upon factors including the position of the object to be grasped (e.g., to provide two support points below heavy objects or to grasp the object at preselected portions thereof) or in light of obstacles in the environment of the object to be grasped. The objects may be grasped externally, or internally in the case of hollow objects or those having internal surfaces. In the case of internal grasping, the fingers would initially be positioned so that the centers C are adjacent the point 0, and then rotated so as to expand the size of the grasping triangle T.

It may be appreciated that a given grasp triangle may be formed by any one of 12 solutions (48 in some special cases) for the calculations for rotating the fingers. That is, if one imagines that grasping triangle T of FIGS. 3 and 4 can be formed with apexes on the circles of FIGS. 3 and 4, there is more than one solution of that triangle having apexes on the circles; the other solutions, e.g., triangle T', are rotated and offset with respect to the triangle T. This provides flexibility in orienting the grasping triangle to grasp selected parts of the workpiece.

If the tactile information (e.g., that from the pressure sensors) indicates that regrasping is needed, e.g., if one of the fingers is positioned at a sharp edge of the object, the manipulation stage I may be controlled to adjust the position of the mounting plate 6 prior to a regrasping operation. Of course, adjustment of the position of the mounting plate by adjustment of the manipulation stage can also be done after the completion of a grasping operation. The robot arm may then be used to move the object W to a new location, optionally together with fine manipulation via control of the Stewart platform. The grasping stage II then releases the grasp and the task is completed.

Although only three fingers 14 are used in the preferred embodiment, it may be appreciated that a greater number of fingers may be provided if desired.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A dexterous hand capable of grasping a randomly shaped object, said dexterous hand comprising:
    a base;
    at least three grasping fingers mounted to said base for rotation about substantially parallel axes, said axes extending substantially perpendicular to said base, each of the fingers comprising a base end intersecting a respective one of said axes and comprising a distal end, each said distal end having a grasping element and being spaced from said respective axis in a direction perpendicular to said respective axis, whereby each of said distal ends describes a circle centered on the respective axis upon rotation of said fingers, wherein each of said fingers comprises a rigid rod or tube having said base end extending substantially transverse to said respective axis and having said distal end extending substantially parallel to said respective axis; and
    means mounted to said base for independently rotating each of said fingers,
    whereby said fingers can grasp the randomly shaped object by rotating said fingers in an arc within a plane substantially parallel to said base.

2. The dexterous hand of claim 1 comprising three of said grasping fingers, wherein said parallel axes comprise fixed axes which form apexes of a triangle.

3. The dexterous hand of claim 1 wherein each said grasping element comprises an elastomeric sphere mounted to one of said distal ends.

4. The dexterous hand of claim 1 wherein all of said fingers are identical.

5. The dexterous hand of claim 1 wherein said fingers are sized and positioned such that said circles meet substantially at a point, whereby small objects may be grasped.

6. The dexterous hand of claim 1 wherein said rotating means comprise:
a servomotor for each of said fingers, each of said servomotors being fixed to said base and having a rotatable output shaft coaxial with one of said axes, wherein the base end of a respective one of said fingers is fixed to said output shaft; and
control means for independently operating each of said servomotors.

7. The dexterous hand of claim 6 further including pressure sensors associated with said rotating means for determining when the object has been grasped.

8. The dexterous hand of claim 6 including means for determining a rotational position of each of said fingers.

9. The dexterous hand of claim 6 wherein said base comprises a mounting plate to which said servomotors are fixed, wherein said axes extend substantially transverse to said mounting plate and said base ends of said fingers extend substantially parallel to said mounting plate.

10. The dexterous hand of claim 9 wherein said base comprises a Stewart platform having telescopic legs, whereby said mounting plate may be moved for fine manipulation of the object.

11. A modular dexterous hand capable of grasping a randomly shaped object, comprising:
a Stewart platform which may be attached to a robot arm, said Stewart platform having a mounting plate, an attachment plate attachable to the robot arm, and six telescoping legs connecting said mounting plate to said attachment plate;
means for defining three fixed rotational axes mounted to said mounting plate, said rotational axes extending substantially parallel to one another and substantially perpendicular to said mounting plate, said axes defining an equilateral triangle;
three grasping fingers, each of said grasping fingers having a base end rotatably mounted on one of said rotational axes and having a distal end having a grasping element and being spaced from said respective axis in a direction perpendicular to said respective axis, whereby each of said distal ends describes a circle centered on said respective axis upon rotation of said fingers, wherein each of said fingers comprise a rigid rod or tube having said base end extending substantially transverse to said respective axis and having said distal end extending substantially parallel to said respective axis; and
means mounted to said mounting plate for independently rotating each of said fingers,
whereby the randomly shaped object can be grasped by rotating said fingers in an arc within a plane substantially parallel to said mounting plate, whereby the object may be subjected to fine positional manipulations by varying a length of said legs of said Stewart platform, and whereby the object may be subjected to gross positional manipulations by movement of the robot arm.

12. The dexterous hand of claim 11 wherein said rotating means comprise:
a servomotor for each of said fingers, each of said servomotors being fixed to said mounting plate and having a rotatable output shaft to which the base end of a respective one of said fingers is fixed; and
control means for independently operating each of said servomotors.

* * * * *